(12) United States Patent
Wakumoto et al.

(10) Patent No.: US 10,560,284 B2
(45) Date of Patent: *Feb. 11, 2020

(54) SYSTEM AND METHODS FOR MAPPING A NETWORK SERVICE PATH

(71) Applicant: Level 3 Communications, LLC, Broomfield, CO (US)

(72) Inventors: Steve R. Wakumoto, Golden, CO (US); Daniel B. Steeves, Lakewood, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,925

(22) Filed: Dec. 21, 2018

(65) Prior Publication Data
US 2019/0132153 A1 May 2, 2019

Related U.S. Application Data

(63) Continuation of application No. 15/596,632, filed on May 16, 2017, now Pat. No. 10,165,588.
(Continued)

(51) Int. Cl.
*H04W 40/00* (2009.01)
*H04L 12/46* (2006.01)
*H04L 29/12* (2006.01)

(52) U.S. Cl.
CPC ...... *H04L 12/4675* (2013.01); *H04L 61/2038* (2013.01); *H04L 61/6022* (2013.01)

(58) Field of Classification Search
CPC .............. H04W 72/1263; H04W 48/14; H04L 61/6022; H04L 61/6086; H04L 61/6081;
(Continued)

(56) References Cited

U.S. PATENT DOCUMENTS 7,697,525 B2 * 4/2010 Zelig ....................... H04L 45/00
370/390
2010/0257239 A1 10/2010 Roberts
(Continued)

OTHER PUBLICATIONS

International Search Report dated Jul. 26, 2017, Int'l Appl. No. PCT/US17/032879, Int'l Filing Dated May 16, 2017, 3 pgs.
(Continued)

*Primary Examiner* — Dai Phuong

(57) ABSTRACT

Aspects of the present disclosure involve methods and systems for mapping network service paths between endpoint devices of a network. An aggregate network traffic database is used to store network traffic data retrieved from network devices of a network. A network service mapper then queries the database using endpoint device identifiers corresponding to endpoint devices to determine which network devices interacted with the endpoint devices during provisioning of previous network service instances. The set of network devices is then compared and analyzed to determine one or more network service paths between a pair of endpoint devices. In certain implementations, network architecture rules and/or network device configuration data is also analyzed to determine an order of the network devices along the one or more network service paths.

15 Claims, 5 Drawing Sheets

Related U.S. Application Data

(60) Provisional application No. 62/373,119, filed on Aug. 10, 2016.

(58) Field of Classification Search
CPC .... H04L 61/095; H04L 61/25; H04M 7/0057; H04M 7/006; H04M 7/0069
See application file for complete search history.

(56) References Cited

U.S. PATENT DOCUMENTS

| | | |
|---|---|---|
| 2012/0033668 A1 | 2/2012 | Humphries |
| 2012/0089673 A1* | 4/2012 | Grammel ................ H04L 45/00 709/203 |
| 2012/0230480 A1* | 9/2012 | Coppage ............. H04L 12/5692 379/93.02 |
| 2013/0155865 A1 | 6/2013 | Xu et al. |
| 2013/0185104 A1 | 7/2013 | Klavins |
| 2014/0012930 A1 | 1/2014 | Weishaupl |
| 2014/0098673 A1 | 4/2014 | Lee et al. |
| 2015/0188780 A1 | 7/2015 | Spieser |
| 2015/0319078 A1 | 11/2015 | Lee |
| 2016/0073365 A1 | 3/2016 | Klockar |
| 2016/0112299 A1* | 4/2016 | Li ........................ H04L 12/6418 370/255 |
| 2016/0112941 A1* | 4/2016 | Desai .................... H04L 12/145 370/329 |
| 2016/0127996 A1* | 5/2016 | Patil ..................... H04W 48/16 370/311 |
| 2017/0353943 A1 | 12/2017 | Skaaksrud |
| 2017/0366458 A1* | 12/2017 | Chan ..................... H04L 45/021 |
| 2018/0049223 A1 | 2/2018 | Wakumoto et al. |
| 2018/0234866 A1 | 8/2018 | Johnsson |

OTHER PUBLICATIONS

Written Opinion of the International Searching Authority dated Jul. 26, 2017, Int'l Appl. No. PCT/US17/032879, Int'l Filing Date May 16, 2017, 11 pgs.

International Preliminary Report on Patentability, dated Feb. 12, 2019, Int'l App. No. PCT/US17/032879, Int'l Filing Date May 16, 2017, 13 pgs.

* cited by examiner

SYSTEM AND METHODS FOR MAPPING A NETWORK SERVICE PATH

BACKGROUND

A telecommunications service provider establishes various communication links across one or more networks and network clusters. For example, the service provider configures and couples routing elements to generate a communication link and extend network services to customer premise equipment. A network service path defines the order or manner in which devices are mapped in the communication link from the customer premise equipment to network elements of a telecommunications network.

It is with these observations in mind, among others, that various aspects of the present disclosure were conceived and developed.

SUMMARY

One implementation of the present disclosure is directed to a method for determining network service paths between endpoint devices of a network. The method includes obtaining a first endpoint device identifier associated with a first endpoint device. The first endpoint device identifier is then used to query an aggregated network traffic database. The aggregated network traffic database stores traffic data associated with one or more network devices of the network including endpoint device identifiers of endpoint devices that have interacted with the network devices. In one embodiment, network traffic may include both customer traffic and network discovery protocols (such as Link Layer Discovery Protocol (lldp) and/or Cisco® Discovery Protocol (cdp)). In response to the query, a set of candidate network devices that each previously interacted with the first endpoint device is provided. A network service path is then mapped between the first endpoint device and a second endpoint device, the network service path including at least a subset of the first set of candidate network devices.

In another aspect of the present disclosure, a system for mapping network service paths in a network is provided. The system includes a network service path mapper executed on a computing device and a network traffic database in communication with the network service path mapper. The network traffic database is in communication with a network and aggregates network traffic data associated with each of a plurality of network devices in the network. The network service path mapper obtains a first set of the network devices having previously interacted with a first endpoint device by querying the network traffic database using a first identifier associated with the first endpoint device. The network service path mapper then identifies at least one network service path between the first endpoint device and a second endpoint device based, at least in part, on the first set of the network devices.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
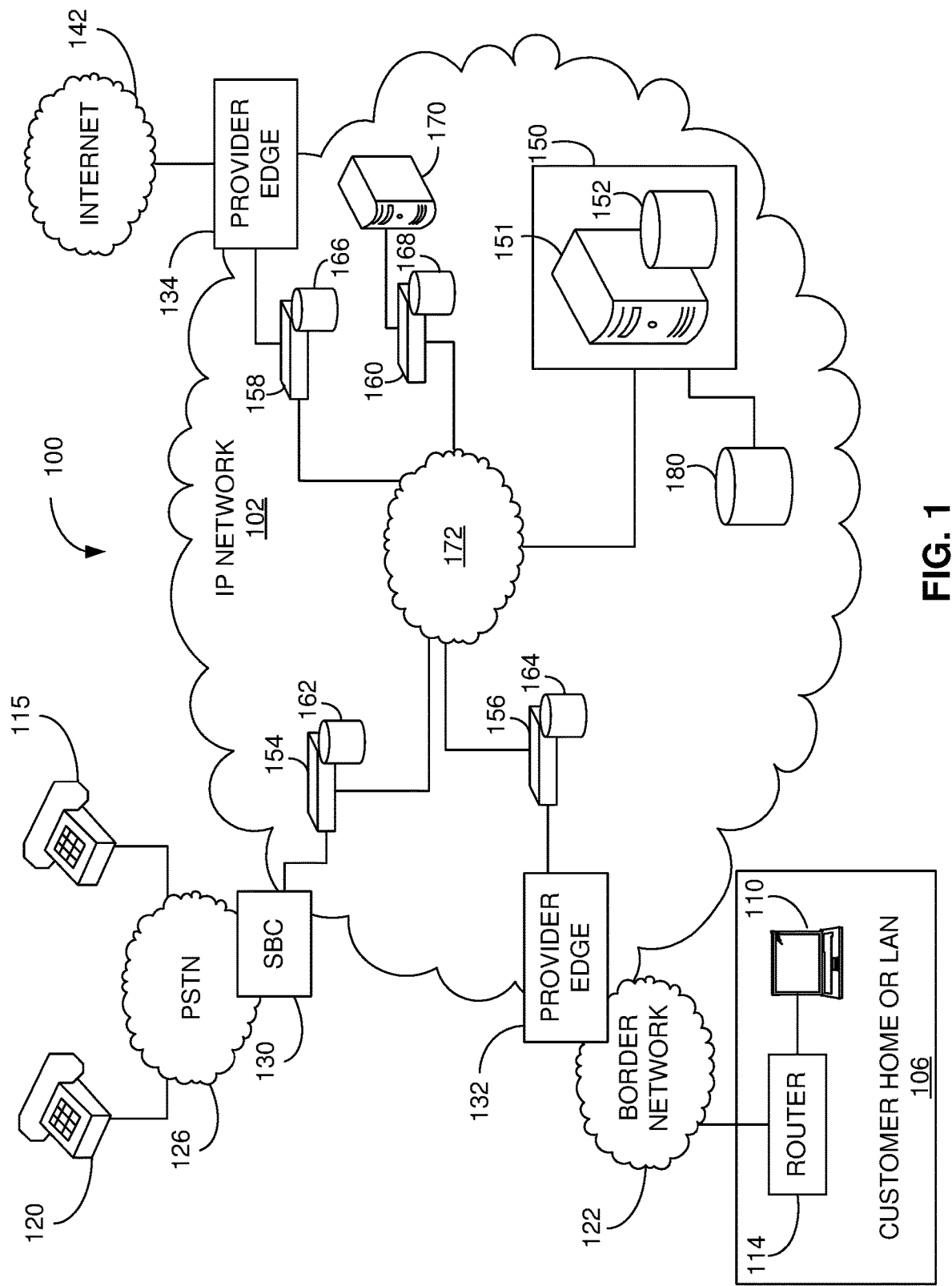
FIG. 1 illustrates a sample network architecture diagram, according to aspects of the present disclosure.

Aspects of the present disclosure include systems, methods, and devices for mapping a network service path/leg by (i) discovering devices of the network service path; and (ii) determining the order of the devices within the path. To do so, network traffic is analyzed to identify devices of a network service path for provisioning a customer service instance. Configuration data and predefined network architecture rules are then accessed to determine the particular order of the devices along the network service path.

Conventionally, network service path mapping requires service providers to maintain an inventory of network devices and, more specifically, interfaces of the network devices. Each interface within the inventory is generally assigned an interface description field and corresponding interface attributes. The use of such inventories is limited in various ways. For example, equipment vendors often limit the size and/or format of interface description fields. Moreover, reliable determination of network service paths depends on the accuracy of the inventory and, as a result, whether network operators consistently and accurately update the inventory. Over time, inaccuracies can arise in the inventory, leading to inaccurate or incomplete network service path determinations. For example, basic human error during data input into the inventory and failure to properly report migration or modification of network equipment (e.g., during system upgrades or in response to outages or equipment failures) can lead to an inaccurate or incomplete inventory. Any subsequent network path determinations based on such a flawed inventory can similarly be inaccurate or incomplete.

In contrast to relying on an inventory, network service path mapping systems, methods, and devices according to the present disclosure determine network service paths based on actual network traffic. To discover devices of a network service path, a device identifier of an endpoint device (corresponding to a starting or finishing node of the network service path) is used to interrogate the network. Specifically, the device identifier is used to query a database or otherwise conduct a search for network elements that have interacted with the endpoint device to provision a customer service instance. The database aggregates network traffic data from dynamic network tables associated with candidate network elements of the network. The database is then used to determine which, if any, of the network elements have interacted with the endpoint device and, as a result, potentially form a part of a network service path associated with the endpoint device. In particular, the database is queried to determine whether the device identifier or attribute has been logged within any of the aggregated network traffic tables. Where the device identifier is logged within network traffic data associated with a certain network element, the network element may be identified as forming a part of the network service path. In certain implementations, matches between the device identifier and certain network elements are filtered or sorted using a virtual local area network (VLAN) identifier of a particular customer or customer service instance. In general, a VLAN identifier is an identifier of a virtual network that is inserted into a packet header for communications shared on the virtual network in order to identify to which VLAN the packet belongs. To the extent the VLAN identified is logged in the network traffic data, it can be used to filter and further identify network elements of the network service path.

In certain implementations, configuration data and predefined network architecture rules regarding the interconnection of network elements are accessed to determine the particular order of the network elements of the network service path. Specifically, each network element may have a particular type, function, or other characteristic which defines a predetermined order or position of the network element within a network service path. Architectural rules may then be used to determine the orientation of the elements within a network service path. For example, where a network element of the network service path is identified as a particular type of router, certain predefined architectural rules may define the specific orientation of the router within the network service path. The order of the network elements of the network service path generally refers to the interconnection of the network elements and, as a result, may be defined by physical, logical, or a combination of both physical and logical relationships between network elements.

FIG. 1 illustrates a network environment 100 including network service path determination functionality according to this disclosure. In general, the network environment 100 provides for establishing communication sessions between network users and for providing one or more network services to network users. For example, users of the network 102 may communicate with each other through communication devices, including voice communications and video communications. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous network elements 154-160. The network elements 154-160 include, but are not limited to gateways, routers, and registrars, which enable communication and/or provide services across the IP network 102. For example, the network elements 154-160 facilitate interaction and communication between the IP network 102 and other entities, such as one or more customer home or business local area networks (LANs) 106. The IP network 102 may include any number of connected network elements, which are collective represented in FIG. 1 as a network 172.

Customer network 106 can include communication devices such as, but not limited to, a personal computer 110 or a telephone connected to a router/firewall 114. Although shown in FIG. 1 as a computer 110, the communication devices may include any type of communication device that receives a multimedia signal, such as an audio, video or web-based signal, and/or a data signal and presents the signal for use by a user of the communication device. The communication and networking components of the customer network 106 enable a user at the customer network 106 to communicate via the IP network 102 to other communication devices, such as another customer network, such as a PSTN 126, and/or the Internet 142. Components of the customer network 106 are typically home- or business-based, but they can be relocated and may be designed for easy portability. For example, the communication device 110 may be a wireless (e.g., cellular) telephone, a smart phone, a tablet, or a portable laptop computer. In some embodiments, multiple communication devices in diverse locations that are owned or operated by a particular entity or customer may be connected through the IP network 102.

The customer network 106 typically connects to the IP network 102 via a border network 122, which may be provided by an Internet Service Provider (ISP). The border network 122 is typically provided and maintained by a business or organization such as a local telephone company or cable company. The border network 122 may provide network/communication-related services to their customers. In contrast, a second communication device 120 accesses, and is accessed by, the IP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the IP Network 102 through a media gateway device, a session border controller (SBC) 130, or a provider edge device 132, 134. In one embodiment, the communication devices may utilize the network to exchange communications and/or access content from a public network, such as the Internet 142. For ease of instruction, only three communication devices 110, 115, and 120 are shown communicating with the IP network 102; however, numerous such devices, and other devices, may be connected with the network, which is equipped to handle multiple simultaneous calls and/or other IP-based communications.

IP network 102 includes or is otherwise in communication with a service path mapping system 150. The service path mapping system 150 is configured to determine network service paths between endpoints of the IP network 102. For example, such endpoints may include provider edge devices 132 and 134, session border controller 130, or any similar device within the IP network 102. For example, as shown in FIG. 1, the IP network 102 includes an IP network computing device 170 that may function as an endpoint.

To map service paths between endpoint devices, the service path mapping system 150 includes a network traffic database 152. The network traffic database 152 aggregates and stores network traffic data from each the network elements 154-160 and any other network elements that may be included in the network 172. For example, each of the network elements 154-160 includes or is otherwise in communication with a respective network table 162-168. During operation, the network elements 154-160 receive network traffic and generate and store records in the network tables 162-168 corresponding to the connections through which the network traffic is received. More specifically, during provisioning of a customer service instance, the network elements 154-160 are connected either directly or indirectly to endpoint devices corresponding to the origination and destination of the customer service instance. The network tables 162-168 of the network elements 154-160 generally include mappings of addresses to ports and also historical data regarding connections made via the network elements 154-160. For example, as part of provisioning a customer service instance from a first endpoint device to a second endpoint device, the network tables 162-168 include a network path originating from a first endpoint device for delivery to a second endpoint device. When the network traffic is received and forwarded by one of the network elements 154-160, the network element generates a record in its corresponding network table. The record generally includes an identifier corresponding to the first endpoint device and may further include additional details regarding the network traffic including, but not limited to, an address of the origin device, a VLAN identifier associated with one or more of the first and second endpoint devices, a device type associated with one or more of the first and second endpoint devices, and other attributes of either of the first and second endpoint devices.

The service path mapping system 150 is configured to periodically retrieve and store data from the network tables 162-168 in the network traffic database 152. Accordingly, the network traffic database 152 provides a centralized aggregation of the network traffic recorded by each of the network elements 154-160. As described later in this disclosure in more detail, the service path mapping system 150 determines network service paths based on the network traffic data stored in the network traffic database 152. For example, in certain implementations, the service path mapping system 150 includes a network service path mapper 151 which may be implemented as a computing device configured to execute a network service path mapping application or similar set of instructions. During execution of the network service path mapping application, the network service path mapper 151 executes a first query based on an identifier associated with the first endpoint device to determine a first set of network elements of the IP network 102 through which data originating from the first endpoint device has passed. The network service path mapper 151 may then determine a second set of network elements of the IP network 102 through which data originating from the second endpoint device has passed and an intersection of the first set and the second set, thereby identifying network elements through which data has or is capable of being transmitted between the first and second endpoint devices. The process of identifying the network elements may be further facilitated by applying one or more filtering operations based on characteristics of the network elements, such as their placement within a VLAN.

The previously described method generally identifies the network elements disposed between the first and second endpoints in a network service path but does not necessarily establish their order along the network service path. Accordingly, in certain implementations, the service path mapping system 150 determines the order of network elements between the first and second endpoints by one or more of analyzing data associated with each identified network element, applying business and network architecture rules based on characteristics of the identified network elements, and the like. The order of the network elements may be based on physical, logical, or a combination of physical and logical locations of the network elements along the network service path. Accordingly, the service path mapping system 150 may include or otherwise have access to a secondary data source 180 containing data for establishing the order of network devices along a network service path. In certain implementations the secondary data source 180 contains one or more rules or rule sets regarding the architecture of the IP network 102. Alternatively or in addition to rules and rule sets, the secondary data source 180 may be a network device inventory or otherwise contain characteristic information regarding network devices of the IP network 102. In either case, the service path mapping system 150 may be configured to retrieve the rules or configuration data from the secondary data source 180 and determine the order or relationship between network devices based on the retrieved rules and configuration data.

Figure 2:
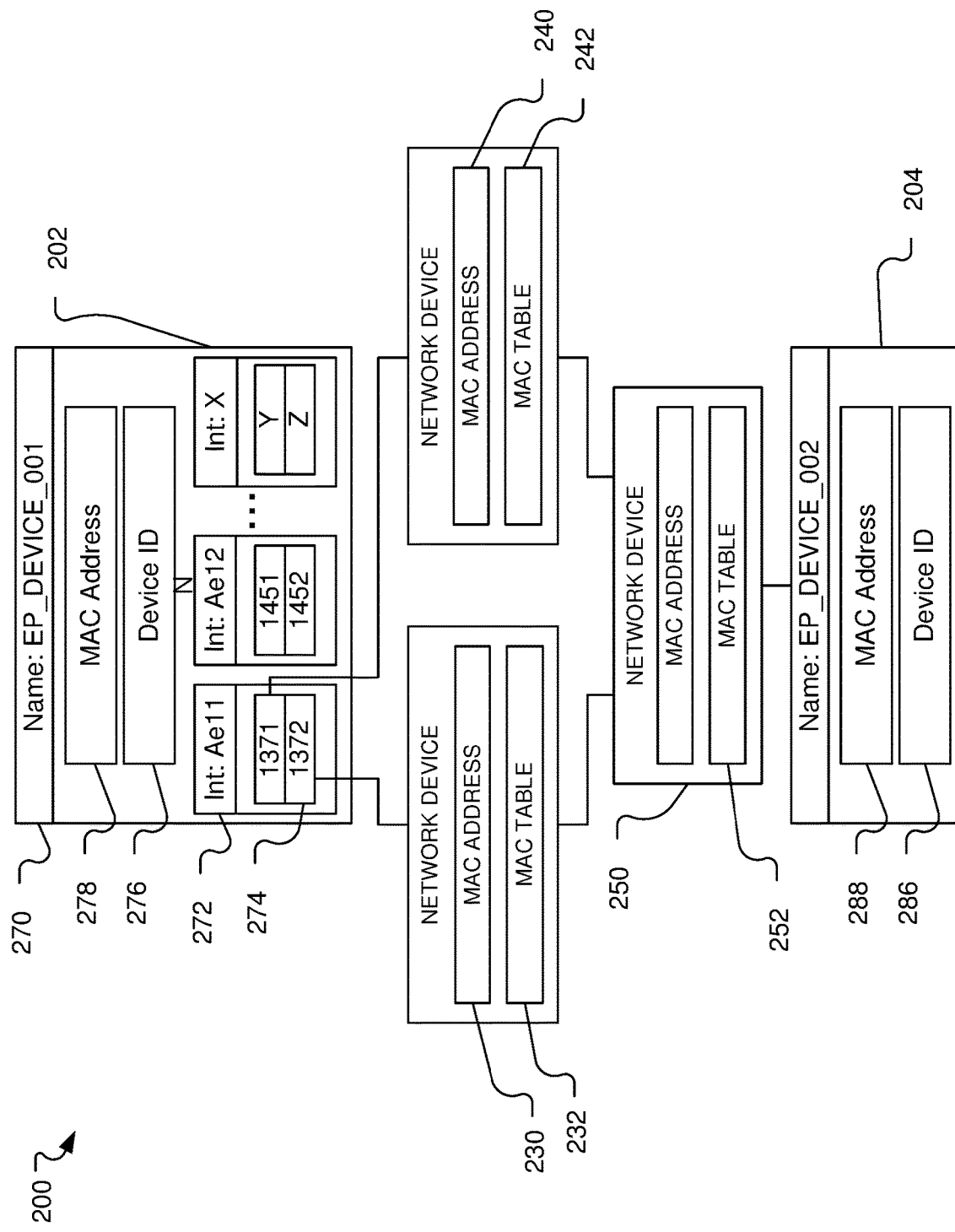
FIG. 2 illustrates discovery of a network service path, according to aspects of the present disclosure.

FIG. 2 is a schematic illustration of a network 200, which may correspond to a portion of the IP network 102 of FIG. 1. The network 200 includes a first endpoint device 202, a second endpoint device 204, and devices of a discovered network service path including a third device 230, a fourth device 240, and a fifth device 250. The first end point device 202 is assigned a device name 270 and includes a network element at a provider edge (PE). The second endpoint device 204 includes managed customer premise equipment (MCPE) devices that extend network services to customer networks. In general, however, the first endpoint device 202 and the second endpoint device 204 may be any networking device for use by the system 100 described above with relation to FIG. 1. Each of the third device 230, the fourth device 240, and the fifth device 250 are network devices along network service path(s) between the first endpoint device 202 and the second endpoint device 204. Devices 230, 240, and 250 may include, without limitation, one or more of a router, a switch, a metro core device, a metro aggregator device, and the like.

As shown in the example of FIG. 2, the device name 270 associated with the first endpoint device 202 is a string of characters, "EP_DEVICE_001," which corresponds to a terminal identifier (TID) of the first endpoint device 202. Use of the TID as the device name 270 is intended only as an example. In other implementations, the device name 270 may be any string of characters. In certain implementations, the device name 270 includes information regarding a specific interface and/or sub-interface of the first endpoint device 202 that define a specific customer service instance. For example, the first endpoint device 202 includes an interface 272 (Ae11) having a sub-interface 274 (1372) which define a specific customer service instance (Ae11.1372) that includes the interface 272 and the sub-interface 274. In certain implementations, the first endpoint device 202 includes a link aggregation group (LAG) that includes each interface, e.g., Ae11, and each sub-interface, e.g., 1372, of the first endpoint device 202. The LAG of the first endpoint device 202 may include additional interfaces, each of which may further include additional sub interfaces. The second endpoint device 204 may include similar arrangements of interfaces, sub-interfaces, and the like, however, for simplicity, such details are not included in FIG. 2.

The first endpoint device 202 is assigned a device identifier (device ID 276) that is unique to the first endpoint device 202. For example, in certain implementations, the first endpoint device 202 is cross-referenced to a media access control (MAC) address 278 that is used as the unique device identifier. Similarly, the second endpoint device 204 is also cross-referenced to a unique identifier (device ID 286), which may also be an address, such as a MAC address 288, assigned to the second endpoint device 204. After provisioning of a customer service along a network path service extending between the first endpoint device 202 and the second endpoint device 204, each device along the network service path tracks data it receives and forwards. For example, network devices often include a MAC table or similar forwarding database that stores data regarding interactions with other network devices. In the implementation of FIG. 2, the network devices 230, 240, and 250 include MAC tables 232, 242, and 252, respectively. The data stored within the MAC table or similar forwarding database often includes an identifier corresponding to the origin of the data being handled by the network device. In the network 200, for example, data sent from the first endpoint device 202 to the second endpoint device 204 would generate entries in MAC table 252 as well as one of MAC table 232 and MAC table 242, based on which network device the data passed through. Similarly, data sent from the second endpoint device 204 to the first endpoint device 202 would generate entries in MAC table 252 as well as one of MAC table 232 and MAC table 242. In either case, each MAC table entry includes the cross-reference to the device identifier of the originating endpoint device.

To perform network service path mapping, network traffic data stored in MAC tables, forwarding databases, and similar data sources of network devices within a network operated by a network service provider are aggregated into a collective or central database, such as the network traffic database 152 of FIG. 1. As such, the collective database includes information about different interactions between endpoint devices of the network and any network devices disposed between such endpoint devices. In some embodiments, data extracted or accessed from the network devices may be normalized before populating the collective database such that the data stored in the collective database is in a common and readily searchable format. The aggregated data is then analyzed to determine which network devices have interacted with pairs of endpoint devices, thereby identifying network devices included in network service paths between the pairs of endpoint devices.

Figure 3:
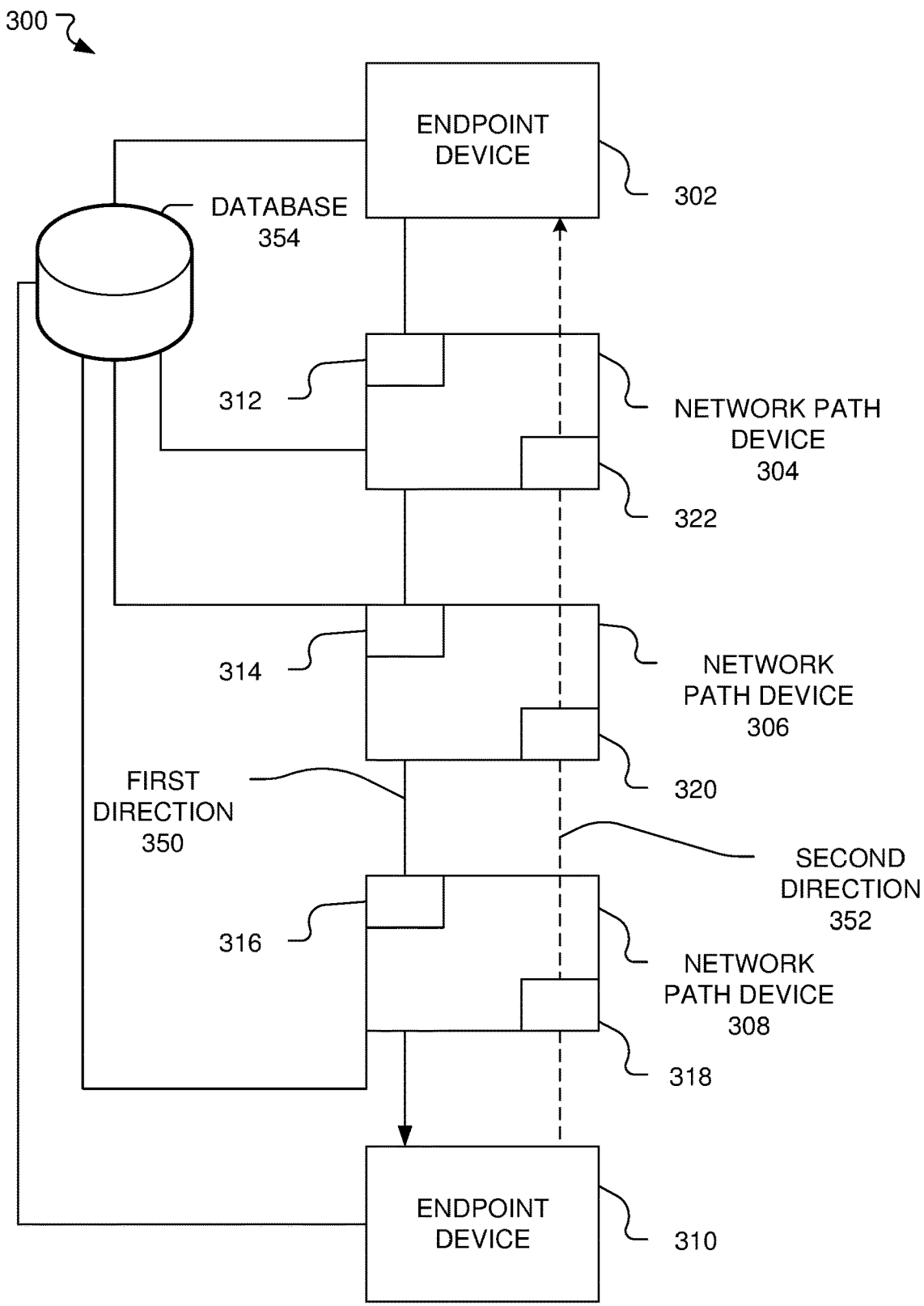
FIG. 3 illustrates mapping a network service path through multiple networks incorporating aspects of FIG. 2, according to aspects of the present disclosure.

FIG. 3 is a schematic illustration of a network portion 300 including a service path between endpoint devices of the network. The network portion 300 includes a first endpoint device 302 and a second endpoint device 310. Disposed between the first endpoint device 302 and the second endpoint device 310 are network devices 304, 306, and 308. Each of the network devices 304, 306, and 308 includes one or more interfaces or ports. For example, the network device 304 includes a first interface 312 and a second interface 322. Similarly, the network device 306 includes interfaces 314 and 320 and the network device 308 includes interfaces 316 and 318. In certain implementations, the first endpoint device 302 includes a customer premise equipment device within or otherwise accessible to a customer network location and the second endpoint device 310 includes a provider edge device or NID accessible to a service provider. It should be understood that in some embodiments the locations of the first endpoint device 302 and the second endpoint device 310 may be reversed (as compared to FIG. 2 which shows a provider edge device 204 as a top device/box).

Identifying the content and order of a network service path for a customer service instance may including two main phases: (i) network element/device discovery, during which the totality of the devices of the network service path are discovered, and (ii) network element device ordering, during which the specific order of the discovered network devices is ascertained. In certain implementations, network device discovery for a particular customer service instance may involve two-way directional discovery. In such implementations, identification of network path devices within the network service path 300 is first conducted from the first endpoint device 302 to the second endpoint device 310 in a first direction 350, and then from the second endpoint device 310 to the first endpoint device 302 in a second direction 352.

Network devices generally include or are associated with a MAC table, a forwarding table, or similar table for recording network traffic. During operation, entries are made in the MAC/forwarding table indicating devices with which the network device interacted during the operation of the given network service instance. For example, in the context of FIG. 3, operation of a network service instance between the first endpoint device 302 and the second endpoint device 310 would create entries in the MAC/forwarding tables of each of the network path devices 304, 306, and 308. More specifically, each of the first endpoint device 302 and the second endpoint device 310 are cross-referenced to a unique device identifier, such as a MAC address. As data is communicated between the first endpoint device 302 and the second endpoint device 310, entries are added to the network traffic tables including the unique identifier associated with the endpoint device from which the communication originated.

As an initial step in automated network path mapping methods according to this disclosure, the MAC/forwarding tables of network devices in one or more networks between the first endpoint device 302 and the second endpoint device 310 may be retrieved or otherwise accessed. The data from the retrieved MAC tables/forwarding tables may be normalized and aggregated within a collective searchable database 354. Accordingly, the database 354 stores traffic forwarding data corresponding to candidate network devices that may form a network service path between the first endpoint device 302 and the second endpoint device 310.

To identify which of the candidate network devices actually form a network service path between the first endpoint device 302 and the second endpoint device 310, a network device discovery operation may be performed. In certain implementations, the network device discovery operation involves performing device discovery in the first direction 350 to identify a first set of devices, performing device discovery in the second direction 352 to identify a second set of devices, and determining one or more network service paths based on any overlaps of the first and second sets of devices.

In the context of FIG. 3, network device discovery may first be performed in the first direction 350, i.e., from the first endpoint device 302 to the second endpoint device 310. To do so, the database 354 is searched to identify interactions between the candidate network devices and the first endpoint device 302. In certain implementations, such searching is conducted by querying the database 354 using a MAC address or similar identifier of the first endpoint device 302. By doing so, a first set of candidate network devices (which in the case of FIG. 3 includes at least the network path devices 304, 306, and 308) that previously interacted with the first endpoint device 302 during operation of one or more network service instances is obtained. Other input parameters for the search may include information specific to a particular customer service instance, such as a VLAN identifier or other such parameter. More specifically, a customer MAC VLAN identifier for the first endpoint device 302 may be used to filter the results of the first direction 350 to identify a specific subset of devices that previously interacted with the first endpoint device 302.

Subsequently, network device discovery may be conducted in the second direction 352, i.e., from the second endpoint device 310 to the first endpoint device 302. To do so, the database 354 is searched to identify interactions between the candidate network devices and the second endpoint device 310. Similar to device discovery in the first direction 350, such searching may be conducted by querying the database 354 using a MAC address or similar identifier of the second endpoint device 310. By doing so, a second set of candidate network devices (which in the case of FIG. 3 includes at least the network path devices 304, 306, and 308) that previously interacted with the second endpoint device 310 during operation of one or more network service instances is obtained.

The first and second set of candidate devices may then be compared to identify the totality of common devices used in provisioning network service instances in the first direction 350 and the second direction 352. Identifying the totality of common devices may also include comparing parameters, such as VLAN identifiers, of the network devices. For example, in certain implementations the same network device may be assigned different VLAN identifiers when provisioning network services in the first direction 350 and in the second direction 352. Accordingly, comparison of the first and second set of candidate network devices may further include comparison of other parameters associated with the network devices. In the case of FIG. 3, for example, such comparison would identify each of network path devices 304, 306, and 308. In certain implementations, the comparison provides a list of network devices disposed between the first endpoint device 302 and the second endpoint device 310 and does not provide an order or similar structure of the identified. However, additional analysis, as described below in the context of FIG. 4, may be performed to identify such relationships between the identified network devices.

After discovery of the network path devices between endpoint devices, the specific order of the network path devices may be ascertained. In certain implementations, ordering of the network path devices includes the application of one or more network architecture rules defining the physical and/or logical arrangement of network elements. The network architecture rules may include one or more logical tests that determine an interconnection within the network of a given network path device along a network path based on various parameters including, without limitation, one or more of characteristics of the network path device, characteristics of a network or sub network in which the network path device is located, and characteristics of other network devices (including other network path devices) within the same network or sub network as the network path device. For example, in certain implementations, the order of network path devices may be determined based on the type of each network path device and a known network topology that defines relationships between network devices based on their type.

In certain implementations, the order of network path devices may further be ascertained based on configuration data associated with the network path devices. Such configuration data may be obtained directly from the network path devices or may be stored in a separate inventory system or database. For example, each network device may be catalogued in an inventory database, each record of which including a unique identifier associated with a particular network device and characteristics of that device. Such characteristics for a particular network device may include, but are not limited to, how the network device has been historically used, the type of network device, other network devices to which the network device is coupled, and the like. For example, where a network device A is determined to form some part of a network service path, an inventory database may be queried using the unique identifier corresponding to the network device A to determine network device A's device type and where the network device A is ordered within similar network service paths. Based on this information, an estimated service path or order of the identified network elements may be identified as a likely service path between endpoint devices.

Figure 4:
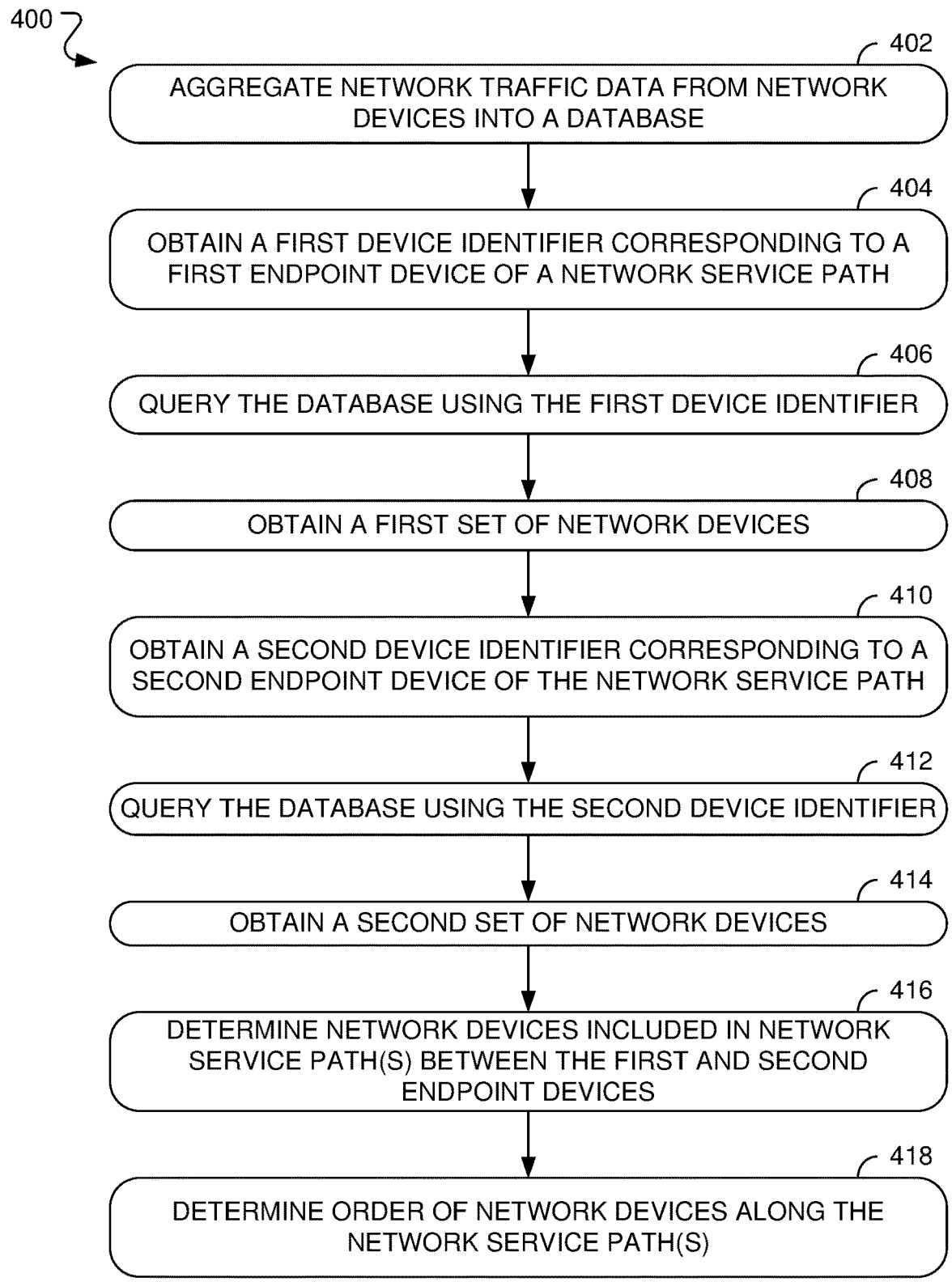
FIG. 4 illustrates one possible process flow for automated discovery and mapping of a network service path, according to aspects of the present disclosure.

FIG. 4 is a flow chart illustrating a method for determining a network service path between endpoint devices in a network. With reference to FIG. 3, the flow chart generally describes a method for determining a network service path between the first endpoint device 302 and the second endpoint device 310.

The method includes aggregating network traffic data from network devices into a searchable database, such as the database 354 of FIG. 3. More specifically, the database 354 is used to aggregate network traffic information corresponding to network service instances provisioned using the network devices in one or more networks or sub networks. Each network device from which traffic data is aggregated maintains a table, such as a MAC or forwarding table, that includes information regarding device interactions during provisioning of particular network service instances. Such data may include an identifier of the origin device (i.e., the endpoint device) associated with the network service instance. Accordingly, for network service instances originating from the first endpoint device 302, the unique identifier associated with the first endpoint device 302 may be used to identify each network device involved in the provision of such network service instances and, as a result, a first set of network devices that may be included in a network service path between the first endpoint device 302 and the second endpoint device 310.

To identify devices that have specifically interacted with the first endpoint device 302, a first identifier corresponding to the first endpoint device 302 is obtained (operation 404). The device identifier may be associated with a service instance originating from the first endpoint device 302 and may also be defined by a network interface or sub interface of the first endpoint device 302. The device identifier corresponding to the first endpoint device 302 may then be used to discover network devices that have interacted with the first endpoint device 302 during provisioning of network service instances. Specifically, the first device identifier may be used as an input parameter to query the database 354 (operation 406). In addition to the first device identifier, other attributes of customer service instances, such as one or more VLAN identifiers corresponding to virtual networks over which the customer service instance is provided, may also be used to further narrow the results of querying the database 354. In response to the query, the database 354 returns a first set of network devices (operation 408) that have interacted with the first endpoint device 302 during provisioning of previous network service instances.

Subsequently, a second device identifier corresponding to the second endpoint device 310 may also be obtained (operation 410) and used, at least in part, to query the database 354 (operation 412). In response to the query, a second set of network devices is obtained (operation 414), which includes network devices that have interacted with the second endpoint device 310 during provisioning of previous network service instances.

The first and second set of network devices may then be compared to identify common network devices (operation 416). By doing so, network devices included in one or more network service paths between the first endpoint device 302 and the second endpoint device 310 may be identified. In addition to identifying network service path devices, the method may further include determining a specific order of the network service path devices along the one or more network service paths. To do so, network architecture rules may be applied and/or configuration attributes of the network service path devices may be retrieved. For example, such information may include a network devices type, the type or identity of network devices the network device may connect to, and historical use data of the network device. Based on the rules and/or configuration information, the relationship between the first endpoint device 302, the second endpoint device 310, and the network service path devices may be determined, thereby mapping the network service path(s) between the first endpoint device 302 and the second endpoint device 310.

Figure 5:
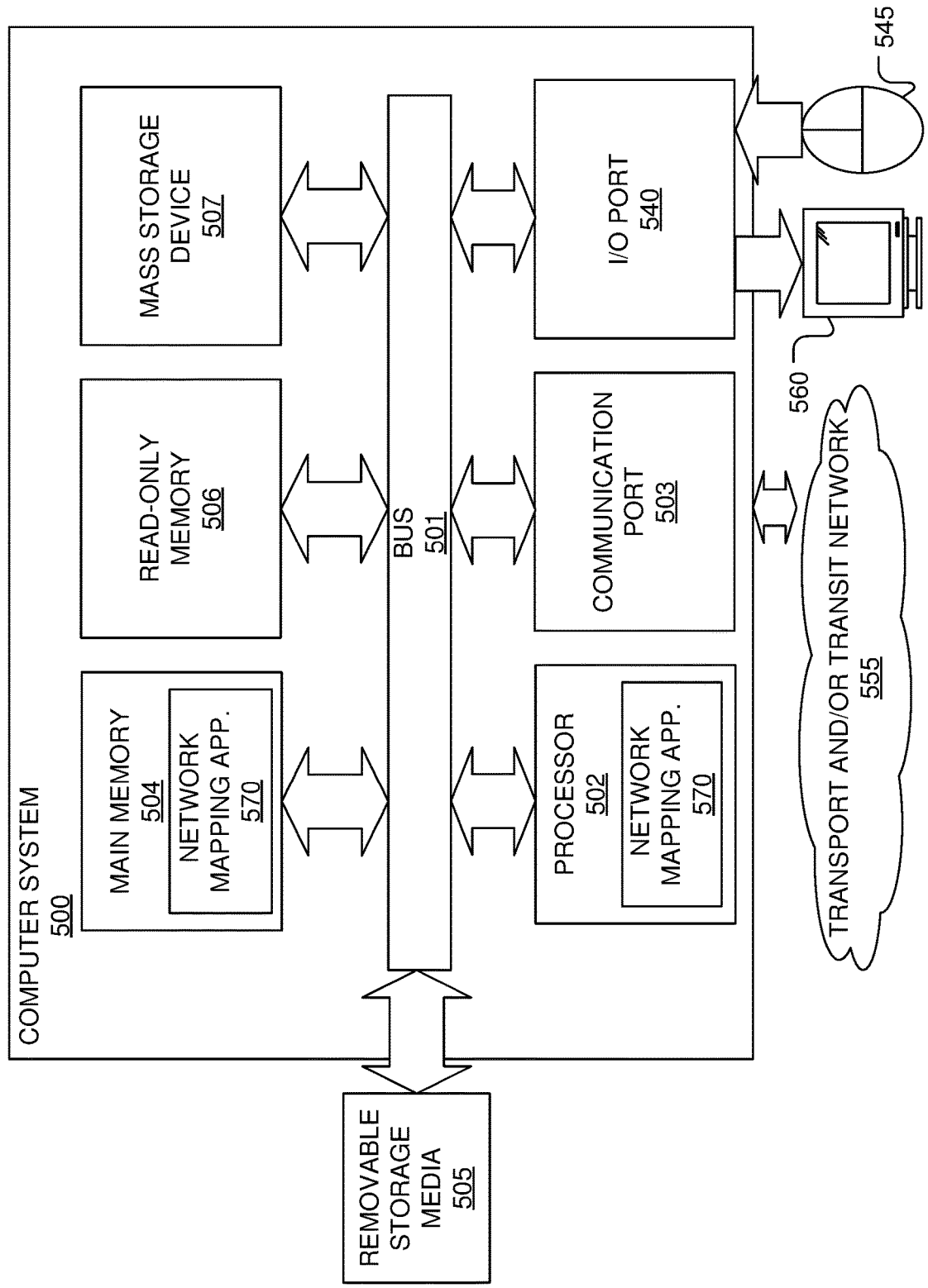
FIG. 5 illustrates an example of a computing system that may implement various services, systems, and methods discussed herein.

FIG. 5 is an example schematic diagram of a computing system 500 that may implement various methodologies discussed herein. For example, the computing system 500 may comprise a computing device used to execute a network mapping application 570 to perform the network path discovery functionality discussed herein. The computing system 500 includes a bus 501 (i.e., interconnect), at least one processor 502 or other computing element, at least one communication port 503, a main memory 504, a removable storage media 505, a read-only memory 506, and a mass storage device 507. Processor(s) 502 can be any known processor, such as, but not limited to, an Intel® Itanium® or Itanium 2® processor(s), AMD® Opteron® or Athlon MP® processor(s), or Motorola® lines of processors. Communication port 503 can be any of an RS-232 port for use with a modem based dial-up connection, a 10/100 Ethernet port, a Gigabit port using copper or fiber, or a USB port. Communication port(s) 503 may be chosen depending on a network such as a Local Area Network (LAN), a Wide Area Network (WAN), or any network to which the computing system 500 connects. Computing system 500 may further include a transport and/or transit network 555, a display screen 560, an I/O port 540, and an input device 545 such as a mouse or keyboard.

Main memory 504 can be Random Access Memory (RAM) or any other dynamic storage device(s) commonly known in the art. Read-only memory 506 can be any static storage device(s) such as Programmable Read-Only Memory (PROM) chips for storing static information such as instructions for processor 502. Mass storage device 507 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 501 communicatively couples processor(s) 502 with the other memory, storage, and communications blocks. Bus 501 can be a PCI/PCI-X, SCSI, or Universal Serial Bus (USB) based system bus (or other) depending on the storage devices used. Removable storage media 505 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 504 is encoded with a network mapping application 570 that supports functionality as discussed above. The network mapping application 570 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret, or otherwise perform processes, such as through logic instructions, executing on the processor 502 and based on the network mapping application 570 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible.

More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of mapping network service paths between endpoint devices of a network, the method comprising:
    obtaining a first endpoint device identifier associated with a first endpoint device;
    querying an aggregated network traffic database with the first endpoint device identifier, wherein the aggregated network traffic database stores traffic data associated with a plurality of network devices of the network and the traffic data includes endpoint device identifiers of endpoint devices that have interacted with the plurality of network devices;
    receiving, in response to querying with the first endpoint device identifier, a first set of candidate network devices, wherein the first set of candidate network devices includes network devices of the plurality of network devices that have interacted with the first endpoint device;
    querying the aggregated network traffic database with respect to a second endpoint device;
    receiving, in response to querying with respect to the second endpoint device, a second set of candidate network devices, wherein the second set of candidate network devices includes network devices of the plurality of network devices that have interacted with the second endpoint device; and
    mapping at least one network service path between the first endpoint device and a second endpoint device, the at least one network service path including a subset of the network devices of the first set of candidate network devices, wherein mapping of the at least one network service path comprises determining common network devices of the first set of candidate network devices and the second set of candidate network devices and the at least one network service path includes at least one of the common network devices.

2. The method of claim 1, wherein mapping the at least one network service path comprises determining an order of network devices along the at least one network service path.

3. The method of claim 2, wherein the order of network devices along the at least one network service path is based on at least one of configuration data of the network devices along the at least one network service path and architectural rules corresponding to an interconnection of network devices within the network.

4. The method of claim 1, wherein the first endpoint device includes at least one of a customer premise equipment device and a network interface device.

5. The method of claim 1 further comprising:
    retrieving the traffic data from the plurality of network devices of the network;
    normalizing the traffic data; and
    storing the traffic data in the aggregated network traffic database.

6. The method of claim 1, wherein:
    the first endpoint device identifier is a media access control (MAC) address associated with an interface of the first endpoint device; and
    the traffic data is obtained from MAC tables cross-referenced with the one or more network devices.

7. The method of claim 1, wherein the traffic data further includes a virtual local area network (VLAN) identifier associated with the corresponding network device, the method further comprising filtering the first set of candidate devices using the VLAN identifier.

8. The method of claim 1, wherein the first endpoint device comprises a link aggregation group (LAG) and a plurality of sub-interfaces that collectively define a plurality of service instances and the endpoint device identifier associated with one of the plurality of sub-interfaces.

9. A system for mapping network service paths in a network, the system comprising:
    a network service path mapper executed on a computing device; and
    a network traffic database in communication with the network service path mapper and a plurality of network devices, the network traffic database aggregating network traffic data associated with each of the plurality of network devices,
    wherein the network service path mapper is configured to:
        obtain a first set of the network devices having previously interacted with a first endpoint device by querying the network traffic database;
        obtain a second set of the network devices having previously interacted with a second endpoint device by querying the network traffic database; and
        identify at least one network service path between the first endpoint device and the second endpoint device based, at least in part, on determining common network devices between the first set of the network devices and the second set of the network devices.

10. The system of claim 9 further comprising a secondary data source in communication with the network service mapper, the secondary data source containing device ordering data comprising at least one of network architecture rules and configuration data of the plurality of network devices.

11. The system of claim 10, wherein the network service path mapper retrieves the device ordering data from the secondary data source and determines an order of network devices along the at least one network service path.

12. The system of claim 9, wherein the network traffic data is aggregated from at least one of MAC and forwarding tables associated with each of the plurality of network devices.

13. A non-transitory computer-readable medium encoded with instructions, executable by a processing device, for operating a component of a telecommunications network, the instructions, when executed by a processing device, cause the processing device to perform the operations of:
    obtaining a first endpoint device identifier associated with a first endpoint device;
    querying an aggregated network traffic database with the first endpoint device identifier, wherein the aggregated network traffic database stores traffic data associated with a plurality of network devices of the network and the traffic data includes endpoint device identifiers of endpoint devices that have interacted with the a plurality of network devices;
    receiving, in response to querying with the first endpoint device identifier, a first set of candidate network devices, wherein the first set of candidate network devices includes network devices of the plurality of network devices that have interacted with the first endpoint device;

querying the aggregated network traffic database with respect to a second endpoint device;

receiving, in response to querying with respect to the second endpoint device, a second set of candidate network devices, wherein the second set of candidate network devices includes network devices of the plurality of network devices that have interacted with the second endpoint device; and mapping at least one network service path between the first endpoint device and a second endpoint device, the at least one network service path including network devices of the first set of candidate network devices, wherein mapping of the at least one network service path comprises determining common network devices of the first set of candidate network devices and the second set of candidate network devices and the at least one network service path includes at least one of the common network devices.

14. The non-transitory computer-readable medium of claim 13 wherein the instructions further cause the processing device to perform the operation of determining an order of network devices along the at least one network service path.

15. The non-transitory computer-readable medium of claim 14, wherein the first endpoint device identifier is a media access control (MAC) address cross-referenced to an interface of the first endpoint device and the traffic data is obtained from MAC tables associated with the plurality of network devices.

* * * * *